(12) United States Patent
Pascucci

(10) Patent No.: US 7,016,931 B2
(45) Date of Patent: Mar. 21, 2006

(54) BINARY-NUMBER COMPARATOR

(75) Inventor: Luigi Pascucci, Sesto San Giovanni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 515 days.

(21) Appl. No.: 10/171,479

(22) Filed: Jun. 13, 2002

(65) Prior Publication Data

US 2003/0023654 A1    Jan. 30, 2003

(30) Foreign Application Priority Data

Jun. 22, 2001    (EP) ................................. 01830424

(51) Int. Cl.
  *G06F 7/02*    (2006.01)
(52) U.S. Cl. ................................. 708/671; 340/146.2
(58) Field of Classification Search ................ 708/671; 340/146.2
  See application file for complete search history.

(56) References Cited

U.S. PATENT DOCUMENTS

| | | | |
|---|---|---|---|
| 4,648,059 A | 3/1987 | Gregorcyk | |
| 4,685,079 A | 8/1987 | Armer | |
| 4,933,662 A * | 6/1990 | Szczepanek | ............. 340/146.2 |
| 5,592,142 A | 1/1997 | Adams et al. | |
| 6,177,862 B1 * | 1/2001 | Sakata | ..................... 340/146.2 |

FOREIGN PATENT DOCUMENTS

EP        0 390 454 A2    10/1990

OTHER PUBLICATIONS

European Search Report from European application No. 01830424, filed Jun. 22, 2001.

* cited by examiner

*Primary Examiner*—Chuong D. Ngo
(74) *Attorney, Agent, or Firm*—Lisa K. Jorgenson; James H. Morris; Wolf, Greenfield & Sacks, P.C.

(57) ABSTRACT

A comparator for comparing binary numbers with N bits, where N>1, in which a plurality (200) of bit-to-bit comparators supplies a plurality of equality-difference signals, arranged in order of decreasing significance of the bits compared, to a matrix of transistors, arranged in 4 columns (201, 202, 203, 204) of N rows of transistors arranged in order, so as to control the gates of the transistors; the matrix, which receives, at the sources of the transistors of two (203, 204) of the columns, the signals representative of the bits of one of the numbers compared and their negated signals, is interconnected in a manner such as to identify the most significant difference by a simultaneous logic process, and to decide, on the basis of the bit signals received, which of the binary numbers is greater than, or greater than or equal to the other, presenting the outcome of the decision at an output (U2) within a very short time and with the use of much fewer active components than are required by conventional combinatory logic.

8 Claims, 7 Drawing Sheets

BINARY-NUMBER COMPARATOR

BACKGROUND OF THE INVENTION

1. Field of the Invention

The present invention relates to an asynchronous binary-number comparator circuit which can detect the greater or lesser of two numbers compared and possibly equality between the two numbers, and which revises its state at high speed upon any variation of the numbers under comparison, and irrespective of its previous state.

2. Discussion of the Related Art

In digital electronic systems it is very often necessary to compare two binary numbers A and B to check whether one is greater than the other (A>B or B>A) or whether they are equal.

The equality condition can easily be identified by relatively simple and fast logic circuits which use elemental logic structures.

In particular, the pairs of analogous bits of the two binary numbers can be compared separately and simultaneously with exclusive OR or XOR logic circuits; the outcomes of the comparisons between individual pairs, put into NOR logic, indicate whether the two numbers are identical or not.

If, however, it is necessary to establish which of two different numbers is the greater or the lesser, there are no elemental logic structures which can perform this operation and it is necessary to make use of complex circuits with multiple stages in cascade, which are therefore expensive and relatively slow and, in most cases, are inadequate for requirements.

In fact, whereas to identify an equality condition, as already stated, it suffices to check the equality of all of the homologous bits simultaneously, in order to identify the greater or lesser number, it is necessary to identify, from the many possible differences, the significant difference, that is, the difference of greatest weight, between homologous bits, and this requires complex circuits the limitations of which will be discussed below with reference to FIGS. 1, 2, and 3.

SUMMARY OF THE INVENTION

The limitations and the disadvantages of the prior art are overcome by the binary-number comparator of the present invention which includes two sections.

A first circuit section comprises a plurality of circuits (the number of circuits being equal to the number of bits of the numbers to be compared) for detecting the condition of equality/inequality between homologous bits, that is, of bits of the same weight. Each of the comparator circuits outputs a first, logic-level 1, electrically-positive signal on a correspondingly arranged continuity/disconnection line, if the bits compared are identical and a logic-level 1, electrically-positive signal on a correspondingly arranged decision line, if the bits compared are different.

A second circuit section comprises a matrix-like structure of transistors arranged to form 4 columns of N rows of transistors, the rows being arranged in order in a manner corresponding to the arrangement of the detector circuits of the first circuit section.

The transistors of the matrix, which operate as pass-gates for the signals representative of the various bits to be compared, are controlled simultaneously by signals generated by the first circuit section and are interconnected in a manner such as to transfer to an output the decision outcome relating to the comparison solely of the pair of most significant bits which differ from one another.

This results in a particularly quick decision structure, operating in parallel, in which the input signals are distributed uniformly to the various active components (transistors) which do not therefore overload the signal generators so as to require the use of buffer stages (which would introduce delays) and which, since, in practice, they receive only two signals each, (source voltage and gate voltage) do not require the use of upstream collector stages for reducing the fan-in.

BRIEF DESCRIPTION OF THE DRAWINGS

The characteristics of the invention, which are defined more precisely by the claims, and its advantages, will become clearer from the following description of a preferred embodiment and of variants thereof, given with reference to the appended drawings, in which:

DETAILED DESCRIPTION

Figure 1:
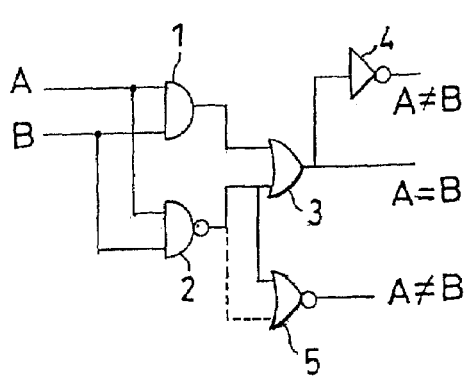
FIG. 1 is an example of the logic layout of a two-bit comparator circuit of the prior art.

For a better understanding of the invention, FIG. 1 represents an example of a circuit of the prior art which can detect equality between two bits and which corresponds to the NXOR (that is, negated XOR) logic function.

The circuit comprises an AND gate 1, a NAND circuit 2, and an OR gate 3 with two inputs connected to the outputs of the gates 1 and 2, respectively.

The bit signals A,B are applied as inputs both to the AND gate 1 and to the NOR gate 2.

Naturally, there is a logic-level 1 signal at the output of the OR gate 3 if the bit signals A and B are identical, that is, if they are both at logic level 1 or 0.

Otherwise, the output of the OR gate 3 is at logic level 0. The circuit for detecting equality is also intrinsically a difference-detecting circuit; if an inverter 4 is arranged in cascade with the OR gate 3, as indicated, clearly there is a logic-level 1 signal at the output of the NOT gate 4 when the bits A and B differ.

Alternatively, as indicated by a broken line, a NOR gate 5 may be arranged in parallel with the OR gate 3, with its inputs connected to the outputs of the gates 1 and 2. In this case also, a logic-level 1 signal is available when the bits A and B differ.

This circuit example draws attention to various aspects.

The signals output by the combinatory network are available some time after the presentation of the signals to the input. The delay depends on the propagation times in the various logic elements in cascade, that is, the elements 2 or 3, in the example of FIG. 1.

The fan-in, fan-out of the logic components is low (each component has only 2 inputs at most and has to control at most only two inputs with its outputs). Moreover, the fan-out of the circuits which generate the signals A, B is also low since they have to control only two inputs.

The various logic elements may therefore be produced by various technologies, with low-powered electronic devices, and with a minimal load applied to the circuits for generating the signals A, B.

Figure 2:
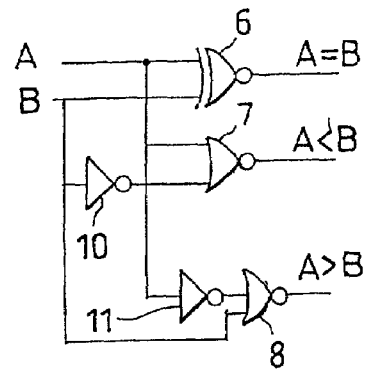
FIG. 2 is an example of the logic layout of another two-bit comparator circuit of the prior art.

A circuit for comparison between two bits A and B can easily be derived from the layout of FIG. 1, as shown in FIG. 2.

It suffices to add to the NXOR 6 logic block (constituted by the logic elements 1, 2, 3 of FIG. 1) two NORs 7, 8 and two NOTs 9, 10, connected as shown, to produce a logic-level 1 signal at the output of the NOR 7 for A<B and a logic-level 1 signal at the output of the NOR 8 for A>B, as can easily be confirmed.

In this case also, the fan-in, fan-out of the components is low, the number of stages in cascade is no greater than two, the propagation time of the combinatory logic circuit is low, and the fan-out demanded of the driver circuits which generate the signals A,B is also low.

The situation which arises when binary numbers constituted by more bits is quite different.

Figure 3:
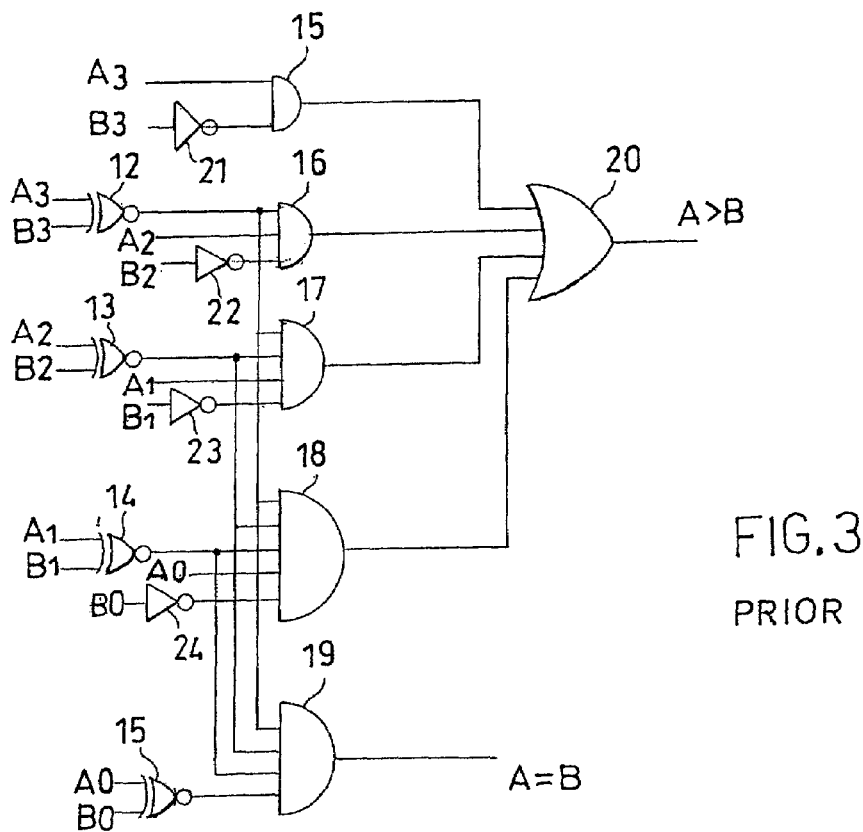
FIG. 3 is the logic layout of a 4-bit binary-number comparator of the prior art.

FIG. 3 shows, for example, the logic structure of a parallel, 4-bit greater-than comparator.

In addition to the NXORs 12, 13, 14, 15 for detecting whether pairs of bits A3 and B3, A2 and B2, A1 and B1, A0 and B0 of the same weight are identical, it is necessary to provide AND logic gates 15, 16, 17, 18, 19, an OR gate 20, and inverters 21, 22, 23, 24.

Basically, the AND gates 15, 16, 17, 18 determine whether the bit Ai (i=3, 2, 1, 0) is equal to 1 whilst the bit Bi of the same weight is equal to zero.

The comparison for the bits of lower weight with indices 2, 1, 0 is subordinated to the checking of the identical condition for the bits of greater weight so as to identify the most significant difference between bits of the two numbers.

The logic behaviour of the circuit is readily understandable to a person skilled in the art. A description thereof is therefore omitted.

It will merely be pointed out that, as the number of bits to be compared increases, the fan-in/fan-out of the components increases out of all proportion and, in order to limit this, it is generally necessary both to interpose intermediate devices, that is, load-splitting buffers, between the inputs and the AND gates 13, . . . 19, and to break up the AND gates into several gates which are recombined in an AND stage downstream.

The same applies to the OR gate 20.

As a result, the combinatory logic circuit is very complex and slow because the path of the signals from the input to the output passes through several logic stages in cascade.

Comparator constructions in which, in order to reduce the fan-in/fan-out, the outcome of the comparison between the two most significant bits is used as a condition for enabling comparison between the two bits of immediately lower weight, and so on, down to the comparison of the two bits of lowest weight, by a serial type logic process is even slower.

Serial constructions in which the comparison, which is limited to only one pair of bits at a time, is performed in sequence with the aid of shift registers are just as slow, at least on average, although they require a smaller number of logic components.

A further consideration may be developed with reference to FIG. 3.

Although it is true that the circuit shown can operate as a less-than comparator instead of as a greater-than comparator and that, for this purpose, it suffices to swap the various input signals Ai, Bi, the circuit is not suitable, without additional complications, for performing other comparison operations such as greater-than or equal to functions (A≧B) or for making up a number M of identical comparison modules each with the ability to compare N bits in order to perform a comparison between numbers constituted by M.N bits.

The circuit shown is therefore not very versatile and is extremely expensive.

Figure 4:
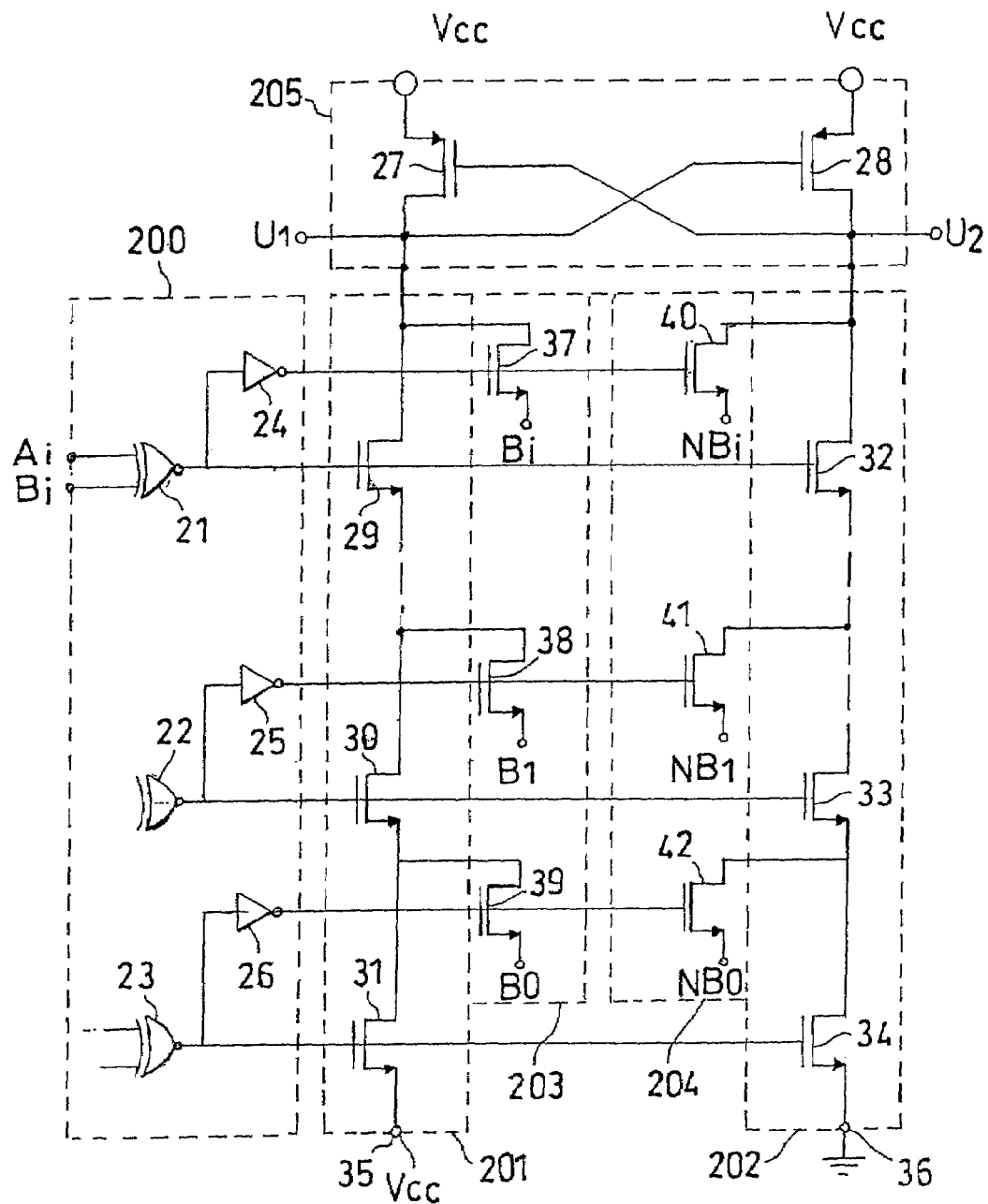
FIG. 4 is the circuit diagram of a multi-bit binary-number comparator formed in accordance with the present invention.

These introductory remarks permit a better appreciation of the characteristics of constructional simplicity and compactness, of speed of operation, and of versatility of the comparator circuit of the present invention, a preferred embodiment of which is shown in FIG. 4.

The comparator circuit of FIG. 4 is constituted basically by two blocks:

a block 200 for identifying the condition of equality/inequality of each pair of homologous bits, that is, bits of the same weight or significance, of the binary numbers to be compared;

a priority decision structure for identifying the difference between homologous bits which is significant for the purposes of the comparison, that is, between the bits of greatest weight or most significant bits of the binary numbers to be compared.

The block 200 comprises a plurality of bit-to-bit comparators, the number of comparators being equal to the number of bits of the numbers to be compared, and each comparator being constituted by a NXOR gate 21, 22, 23 with two inputs and by an inverter 24, 25, 26.

The comparators may be formed by conventional logic components, as shown, or even by pass-gates, that is, in DPTL logic (differential pass transistor logic) which is a particular form of implementation in CMOS technology.

The various possible constructions will be described in detail below.

It will suffice here to point that the NXOR element 21 receives as inputs the most significant bits Ai, Bi of the numbers A and B to be compared, respectively, and outputs a logic-level 1 signal (hereinafter corresponding to a positive voltage) if the two bits Ai and Bi are equal.

It is thus clear that, at the output of NOT 24, the input of which is connected to the output of NXOR 21, there is a logic-level 1 signal when the bits Ai and Bi compared are different.

A similar function is performed on the less significant pairs of bits A1, B1 and A0, B0, in order, by the NXORs 22, 23 and by the inverters 25, 26.

The decision structure comprises a matrix of n-channel transistors divided into four columns 201, 202, 203, 204 and into a number of rows equal to the number of bits of the numbers to be compared.

It also comprises a signal supply and regeneration block 205, which is constituted, in its simplest form, by two p-channel transistors 27, 28 with their sources connected to a positive voltage supply Vcc and with their gates and drains connected to one another in a crossed arrangement.

The transistors 29, 30, 31 of the column 201 are connected to one another in series, as are the transistors 32, 33, 34 of the column 202.

The drain of the first transistor 29 of the column 201 is connected to the drain of the transistor 27 and forms therewith a first output node U1.

Similarly, the drain of the first transistor 32 of the column 202 is connected to the drain of the transistor 28 and forms therewith a second output node U2.

The gates of the transistors of the columns 201 and 202 are controlled by the outputs of the bit-to-bit comparators, arranged in decreasing order, starting from the outputs U1, U2.

The two columns 201, 202 of transistors in series terminate at the opposite end in two terminals 35 and 36, respectively, for receiving respective fixed or variable reference signals which, in any case, are positive or zero and depend on the various possible applications; in the embodiment shown in FIG. 4, the reference signals are constituted by the voltage Vcc applied to the terminal 35 and by the earth voltage (0V) applied to the terminal 36.

The transistors 37, 38, 39 of the column 203, which are arranged in rows, have their drains connected, respectively and in order, to the output node U1 and to the intermediate nodes between the transistors of the column 201.

Similarly, the transistors 40, 41, 42 of the column 204, which are arranged in rows, have their drains connected, respectively and in order, to the output node U2 and to the intermediate nodes between the transistors of the column 202.

The source electrodes of the transistors of the columns 203, 204 constitute input terminals to which signals that depend on the desired function are applied; in the embodiment shown in FIG. 4, these signals are constituted, for the two columns, in order and respectively, by the signals Bi, B1, B0, representative of the homologous bits, and by their negated signals NBi, NB1, NB0.

The gates of the transistors of the columns 201 and 202 are driven, in order, starting with the transistors connected to the output nodes U1, U2, by the equality signals output by the NXOR circuits 21, 22, 23.

The gates of the transistors of the columns 203, 204, on the other hand, are driven, in order, starting with the transistors connected to the output nodes U1, U2, by the difference signals output by the inverters 24, 25, 26.

These introductory remarks lead to a consideration of fundamental importance.

The transistors of the columns 201 and 202 belonging to the same row of the matrix, together with the line for driving the corresponding gates, form a line of continuity or of disconnection of the matrix, according to whether the output level of the corresponding driver is 1 or 0.

In other words, they allow the propagation of signals along the series of transistors of the columns 201, 202 as far as the output nodes U1, U2, or block it by disconnecting and isolating a portion of the matrix, the state of which thus has no effect on the electrical behaviour of the remaining portion.

For example, if the comparator circuit 21 recognizes that the most significant bits Ai, Bi are different, its output adopts electrical level 0 and the transistors 29, 32 are made non-conductive, that is, are opened, irrespective of whether their sources are at positive or zero electrical level.

In these conditions, the electrical states of the outputs U1 and U2 depend exclusively on the signals present at the sources of the transistors 37, 40 of the columns 203 and 204.

It is in fact clear that, in these conditions, the output of the NOT 24 is at positive level and can make the transistors 37, 40 conductive, that is, close them (if a voltage signal lower than the gate-biasing voltage is present at their sources) and constitutes therewith the line which may be defined as a decision line.

If, on the other hand, the comparator circuit 21 recognizes that the most significant bits Ai, Bi are identical, its output is at positive electrical level, corresponding to logic 1, and the transistors 29, 32 are made conductive, that is, are closed, and enable the signals present at their sources to be transferred towards the output nodes U1 and U2, respectively, if these signals have a level below the gate-biasing voltage.

Conversely, the transistors 37, 40, with gates driven by a signal at level 0 (naturally, the output of the inverter 24 is 0) are opened and the signals present at their sources do not affect the states of the output nodes U1, U2.

Naturally, the same considerations apply to the rows of transistors and to the corresponding driver circuits relating to the bits of decreasing significance.

It can therefore be concluded that the states of the outputs U1 and U2 depend on the most significant condition of inequality, and the conditions of equality/inequality between bits of lower weight, that is, less significant bits, are completely irrelevant.

Thus, for example, again with reference to FIG. 4, if Ai=1 and Bi=0 (and hence NBi=1), the transistor 37, which is conductive, forces the output U1 to 0.

The transistor 40, on the other hand, which is also conductive, forces to the node U2 a weak 1 (Vcc−Vt) which is nevertheless fully regenerated to the positive level substantially equal to Vcc as a result of the crossed connection between the transistors 27, 28.

If U1 is forced to 0, the transistor 28 is made conductive and connects the output node U2 to the supply voltage Vcc.

It has thus been seen that the circuit of FIG. 4 performs the function of a greater-than comparator and its output U2 is brought to 1 if, and only if, A>B.

In fact for A=B, all of the continuity lines would be closed and the series of transistors of the column 202, all of which would be closed, would bring the terminal U2 to the earth voltage present at the terminal 36 and, by making the transistor 27 conductive, the terminal U2 in turn would force the terminal U1 to the voltage Vcc.

In other words, the voltage present at the terminals 35, 36 determines the function performed by the comparator and decides, in this case, that A is not greater than B.

Similarly, if A<B, for example because A1=0 and B1=1 (and hence NB1=0), the transistors 41 and 32, both of which are conductive, apply the signal NB1=0 to the node U2 which in turn forces the node U1 to the voltage Vcc=1 by means of the transistor 27.

It was mentioned above that the comparator described is very versatile and can perform different functions according to the levels of the signals applied to the terminals 35, 36 and to the sources of the transistors of the columns 203, 204.

Before these aspects are developed, however, the following considerations, which relate to the level of the 0 signal which is applied to the node U2 or U1 are essential.

It is in fact clear that the output impedance of the node U2, when it is connected to earth, depends on the number of transistors such as 32, 33, 34 through which the signal has to pass, and may adopt an appreciable value which, in dependence on the load connected to the node, slows the switching speed of the comparator and degrades its performance.

The same applies to the node U1.

This limits the number of transistors which can be connected in series to form the two columns 201 and 202 and thus the number of bits which can be compared.

In practice, more than satisfactory performance is obtained if the number of transistors is limited to 7–8, but this limit, which would prevent comparison between numbers with numbers of bits greater than 7–8, can easily be overcome by the following measures:
1) by a regeneration circuit which re-establishes the level of the zero signals at the outputs U1 and U2;
2) by connecting several modules such as that shown in FIG. 4 in cascade.

Figure 5:
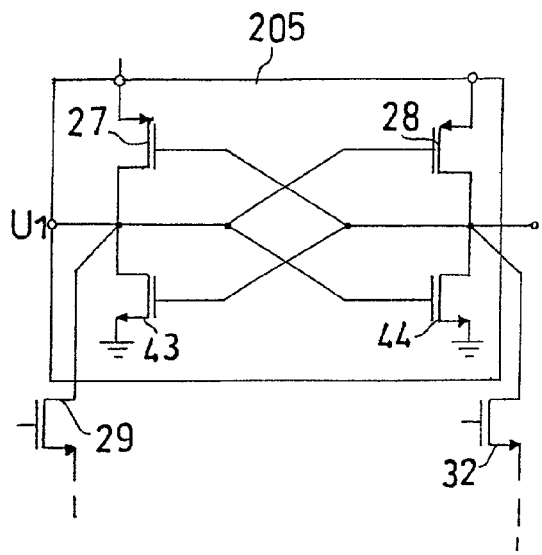
FIG. 5 is a first circuit variant of a portion of the comparator of FIG. 4.

FIG. 5 shows a first variant of the supply and regeneration block 205 which is particularly advantageous because it not only applies the voltage Vcc to one or other of the output nodes with the interposition purely of a p-channel transistor, but also enables the earth voltage GND to be applied to one or other of the output nodes with the interposition purely of an n-channel transistor which is made conductive, and thus with an output impedance which is very low and is practically independent of the state of the matrix of transistors of the comparator.

In FIG. 5, the supply block 205 is constituted, in addition to the p-channel transistors 27, 28, also by a pair of n-channel transistors 43, 44, with their drains connected to the output nodes U1 and U2, respectively, with their sources connected to earth, and with their gates in a crossed connection (that is, the gate of the transistor 43 is connected to the drain of the transistor 44 and to U2 and the gate of the transistor 44 is connected to the drain of the transistor 43 and to U1).

Clearly, if the comparison matrix, which is represented in this case purely by the transistors 32, 29, tends to bring the node U2 to GND and makes the transistor 27 conductive, and the node U1 rises to Vcc, effectively bringing about conduction of the transistor 44, anchoring the node U2 to earth by means of its low channel resistance.

Similarly, if the comparison matrix tends to bring the node U1 to GND by means of the transistor 29, the transistor 28 is made conductive, and the node U2 rises to Vcc, effectively bringing about conduction in the transistor 43, with a regenerative effect on the signal present at U1.

Figure 7:
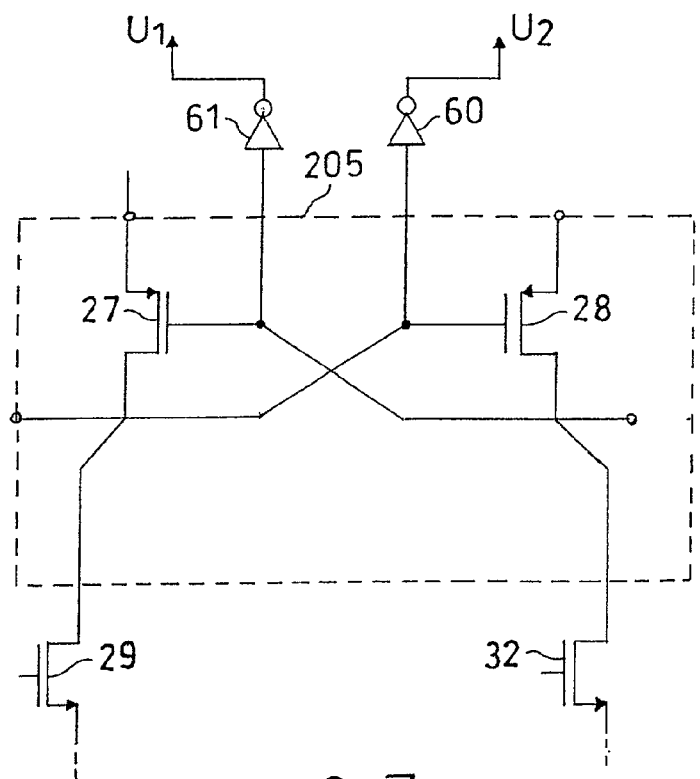
FIG. 7 is a logic layout equivalent to the variant of FIG. 5.

In practice, as shown in FIG. 7, the two pairs of transistors 27, 43, and 28, 44 form a pair of conventional inverters connected back to back.

Figure 6:
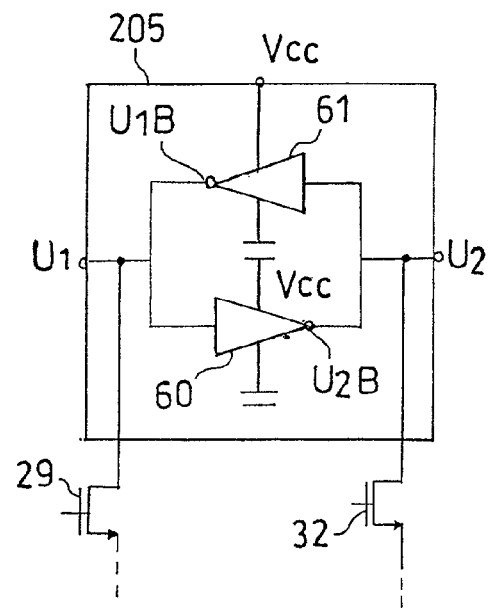
FIG. 6 is a second circuit variant of a portion of the comparator of FIG. 4.

If a greater reduction of the output impedance is required, the supply block 205 may be modified as in FIG. 6, in which the drains of the transistors 29, 32, that is, the nodes U1, U2, are connected to the inputs of respective output buffers 60, 61 the outputs U2B, U1B of which constitute buffered outputs of the comparator corresponding to the output nodes U1, U2, respectively, if the buffers are of the inverting type, as shown, or to U2, U1, respectively, if the buffers are non-inverting.

This measure enables several modular comparator circuits such as that of FIG. 4 to be connected in cascade in order to perform the comparison between binary numbers with more than 8 bits, for example, with 16, 32, or even 64 bits.

The comparison is performed in parallel on all of the bits simultaneously, without the introduction of constructional complications which increase with the dimensions, and without the introduction of substantial delays which are limited to the serial arrangement of two (or more) blocks.

Figure 8:
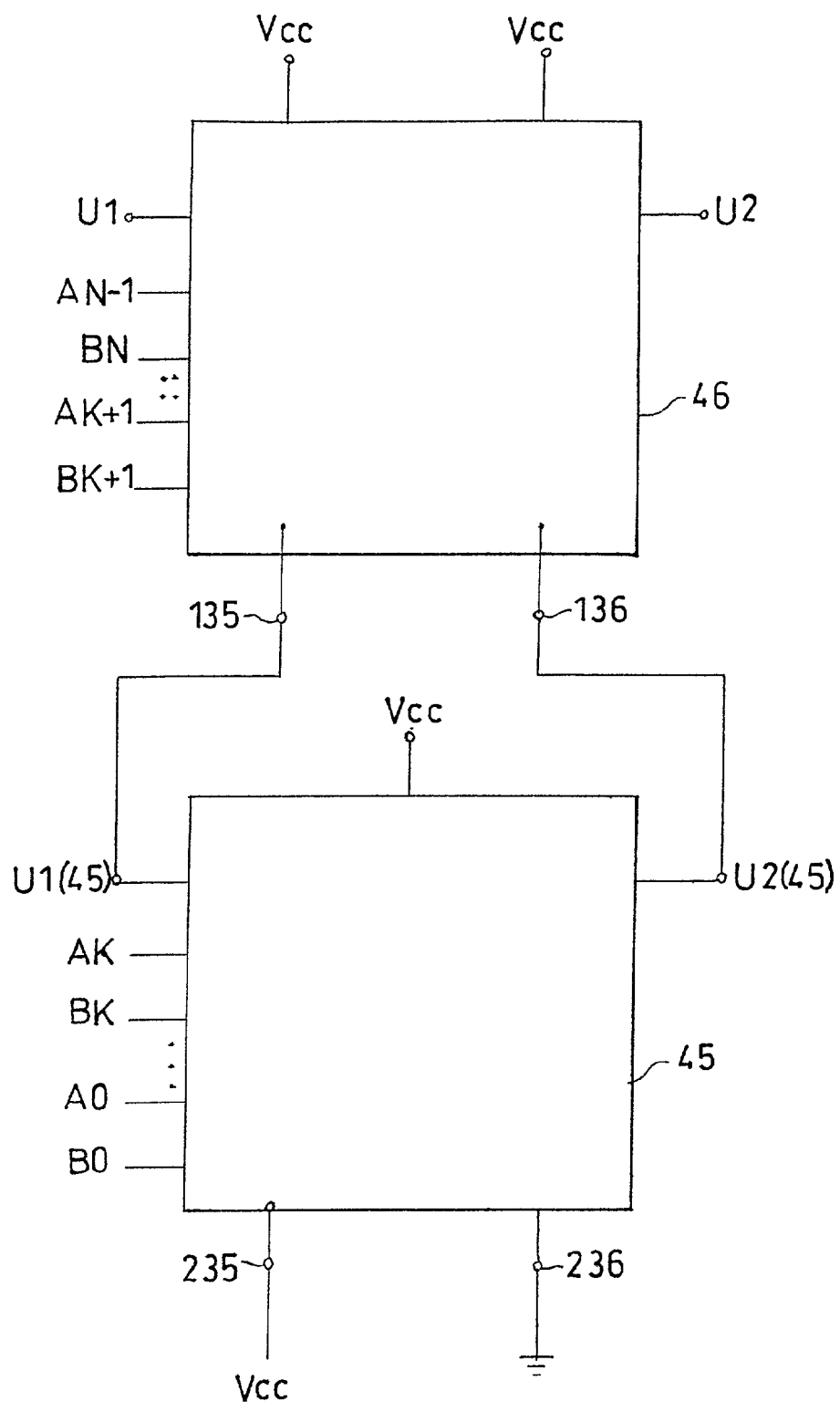
FIG. 8 shows two comparators of the type shown in FIG. 4, modified in accordance with FIG. 5 or FIG. 6, and connected in cascade, for comparing binary numbers with numbers of bits greater than the number of bits compared by a single comparator.

FIG. 8 shows this solution.

A first greater-than comparator 45, identical to that shown in FIG. 4, with the sole difference that the supply block is modified as in FIG. 5 or FIG. 7, receives as inputs the least significant bits A0, ... Ak and B0, ... Bk of two n-bit binary numbers A, B to be compared.

The terminals 235 and 236, which are homologous with the terminals 35, 36 of FIG. 4, are connected, as in the embodiment of FIG. 4, to the voltage Vcc and to earth, respectively.

A second greater-than comparator 46 identical to the previous one, receives as inputs, the most significant bits Ak+1, ... An−1 and Bk+1, ... Bn−1, arranged in decreasing order of the numbers to be compared.

In contrast with the comparator 45, the terminals 135, 136 of the comparator 46, which are homologous with the terminals 35, 36 of FIG. 4, are connected to the output nodes U1(45) and U2(45) of the comparator 45.

Clearly, if the numbers A and B differ in their most significant bits, the comparison matrix of the comparator 46 disconnects and isolates the whole of that portion of the logic which is not relevant for the comparison and decides purely on the basis of the most significant difference, detected between the most significant bits persisting in the same block.

If, however, the comparison matrix of the comparator 46 detects that all of the pairs of significant bits received as inputs are identical, the two columns of transistors in series in the matrix of the comparator 46, all of which are closed, constitute two continuity channels which connect the nodes U1(45) and U2(45) to the output nodes U1(46) and U2(46) of the comparator 46, respectively.

The logic/electrical levels of the output nodes of the comparator 45 are therefore transferred, unchanged, to the output nodes of the comparator 46 which therefore necessarily reflect the outcome of the comparison performed by the comparator 45 with the delays due solely to the propagation time along the continuity channels, which are comparable to two conductors.

If all of the bit-to-bit comparisons are found to be equal, then the nodes 235, 236 will decide, setting U2=0 (A≦B).

Naturally, more than two comparators may be connected in cascade as described and it is thus possible to achieve any desired parallelism for the comparison of binary numbers with any number of bits, with the sole possible limitation imposed by a maximum permissible comparison speed.

In this connection, before pointing out the further aspect of the versatility of the device, it is appropriate to develop the following considerations with reference to FIG. 4.

It will be noted that the block 200 for identifying the equality/inequality condition between pairs of bits having the same weight introduces limited propagation delays corresponding to the transfer of signals through 2 or 3 logic stages in cascade.

To these propagation delays, the logic matrix which constitutes the decision structure adds merely the switching delay of one transistor, because all of the transistors are driven simultaneously.

As a result, the set-up time of the comparator is extremely short if compared with that of known constructions.

The speed is further increased owing to the fact that all of the signals input to the device have to drive at most two loads and the same applies to the internal circuits which in turn generate signals.

In other words, the various signals are distributed uniformly over the various elements, and load-splitting buffers or input-splitting buffers are not necessary.

The switching times of the transistors are therefore extremely quick and, at the same time, are compatible with very low-powered and compact electronic driver circuits.

Moreover, the number of elemental components necessary to form the circuit is much lower than that required to form conventional comparators.

Finally, the modularity of the structure is to be noted; whilst interfacing with input registers, it does not give rise to inefficiencies in terms of layout, that is, of the topographical arrangement of the various components on a substrate, avoiding the formation of buses or connections of combinatory construction.

In order to produce the comparison matrix, in fact only 4×N+2 (or 4) transistors are required, where N is the number of bits to be compared.

In contrast, the production of a conventional comparator such as that of FIG. 3 (excluding the NXORs and input inverters), with implementation in CMOS technology, would require a number of transistors which increases more than proportionally with the number of bits to be compared (in practice, with the square of N).

The further aspect of the comparator circuit described, that is, its versatility, can now be considered.

It has been pointed out with reference to FIG. 4 that, in dependence on the signals applied to the terminals 35, 36 and to the transistors of the discrimination columns, the circuit operates as a greater-than detector:

that is

U2=1 for A>B U2=0 for A≦B

U1=1 for A≦B U1=0 for A>B.

This result is achieved by connecting the terminals 35, 36 to the voltage Vcc and to earth, respectively, and connecting the sources of the transistors of the column 203 to the bit signals Bi, B1, B0 and the sources of the transistors of the column 204 to the signals NBi, . . . NB1, NB0.

Naturally, as can easily be confirmed, the same result is obtained if the signals Bi, . . . B1, B0 are exchanged with the signals NAi, . . . NA1, NA0, and/or (it is stressed: and/or) the signals NBi, . . . NB1, NB0 are exchanged with the signals Ai, . . . A1, A0.

In other words, the signals Ai, NBi and NAi, Bi are interchangeable.

However, the comparator described can also operate as a greater-than or equal to detector, and consequently as a less-than detector.

Figure 9:
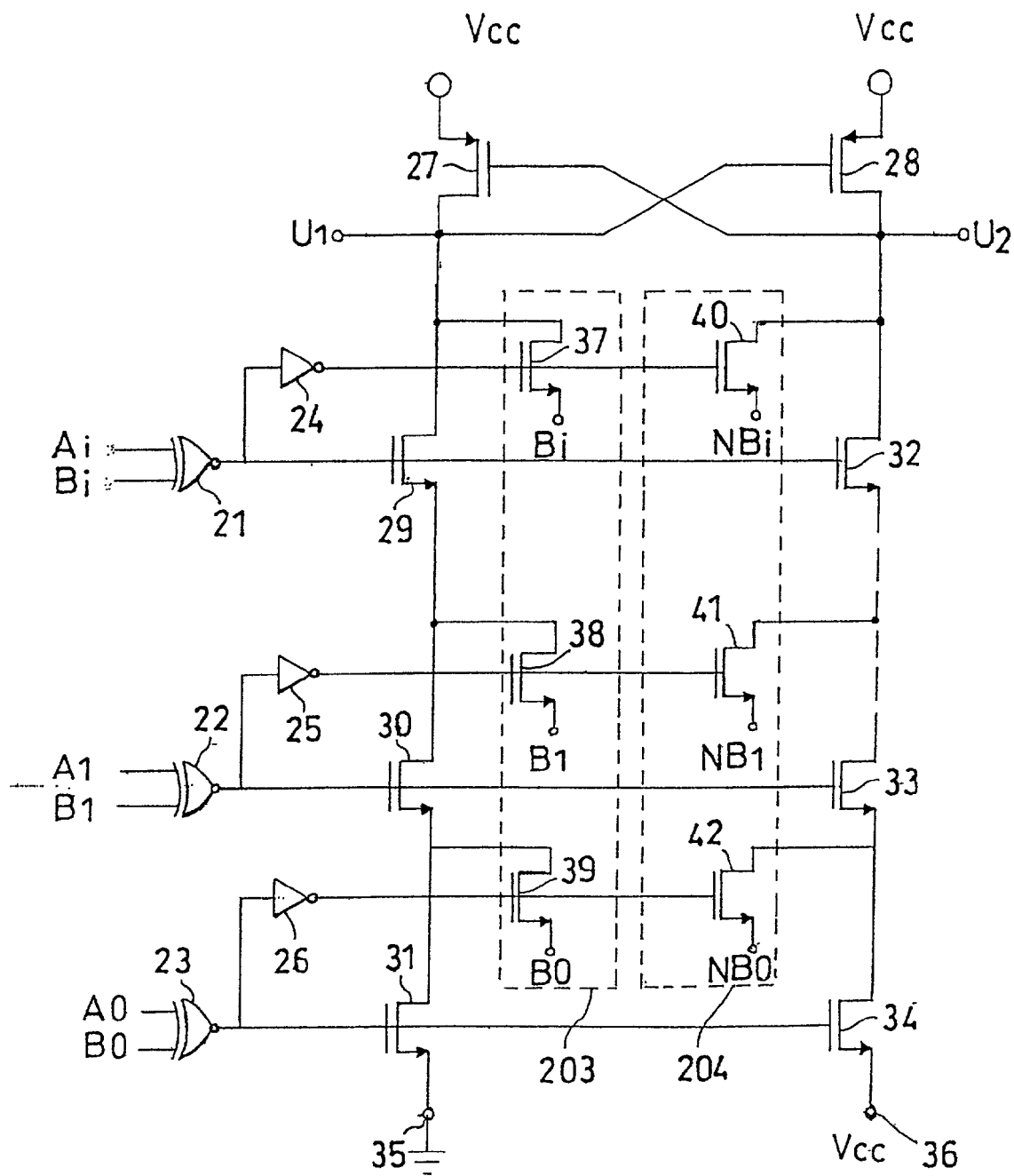
FIG. 9 is the circuit diagram of the comparator of FIG. 4, connected to external voltage sources in order to perform the specific function of a greater-than or equal to comparator.

As shown in FIG. 9, it suffices, for this purpose, to reverse the polarities of the signals applied to the inputs 35 and 36, in comparison with FIG. 4.

In the case of equality, the channel formed by the transistors of the column 201 bring the output node U1 to zero and U2 consequently rises to logic 1 (=Vcc).

In the case of a difference with A>B, the most significant decision line brings the output node U1 to 0 and U2 consequently rises to 1.

Thus U2=1 for A≧B and U1=1 for A<B

It is interesting to note that the comparator circuit can operate as an equality/inequality detector.

For this purpose, in the circuit of FIG. 8, it suffices to connect the sources of the transistors of column 203 to the supply voltage Vcc and the sources of the transistors of column 204 to earth.

For A=B, the node U1 is thus brought to 0 and the node U2 rises to 1 (Vcc), whilst for A≠B the node U2 is brought to earth and the node U1 rises to 1 (=Vcc).

Further variations and combinations of the signals applied to the sources of the transistors of the columns 203, 204 and to the column terminals 35, 36 may be devised to achieve different functions such as the comparison or one or more ranges of the binary numbers, possibly performed in two time stages, for example, to check whether the two numbers differ by more or less than a certain amount, expressed in binary code.

For completeness of description, two preferred embodiments of the bit-to-bit comparators such as the comparator 21 and the inverter 24 of FIG. 4 are also described.

Figure 10:
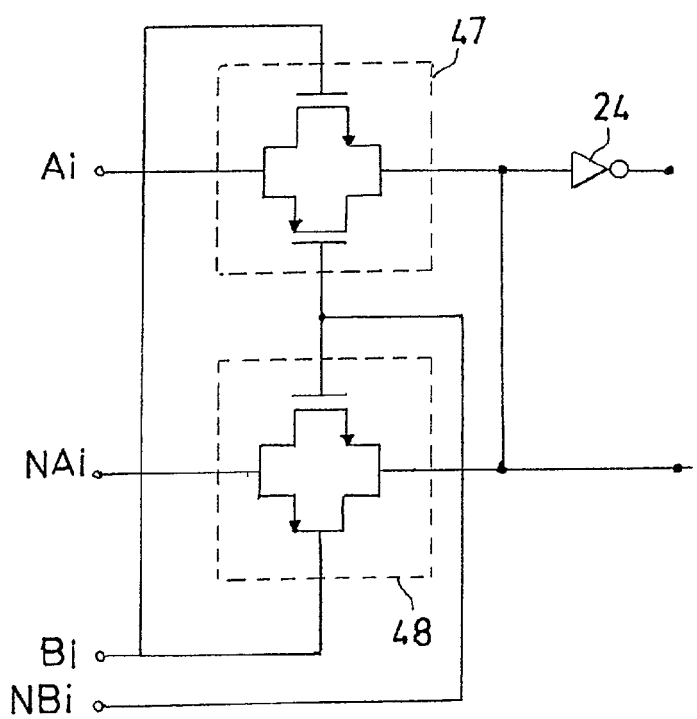
FIG. 10 is the circuit diagram of a two-bit comparator formed with "pass gates"

With reference to FIG. 10, the comparator 21 is formed simply by a pair of CMOS transfer gates, also known as "pass gates" 47, 48, each of which is constituted by two complementary transistors which have their sources and drains connected to one another, and which receive as inputs the signal Ai and its negated signal NAi, respectively, and are driven by the pair of signals Bi and NBi applied to one and to the other of the gates of each pair, respectively.

The outputs of the two pass-gates 47, 48 are connected in a wired OR arrangement on which a logic 1/electrical Vcc signal is present when Ai and Bi are equal. This circuit has the merit of being constituted by few components and is very quick but still requires an inverter 24 for generating the inequality signal which drives the discrimination line.

The inverter 24, in its simplest form, is constituted by an n-channel transistor and by a p-channel transistor. P-channel transistors are intrinsically slower in switching and more bulky than n-channel transistors. It is therefore desirable to reduce their use to a minimum.

Figure 11:
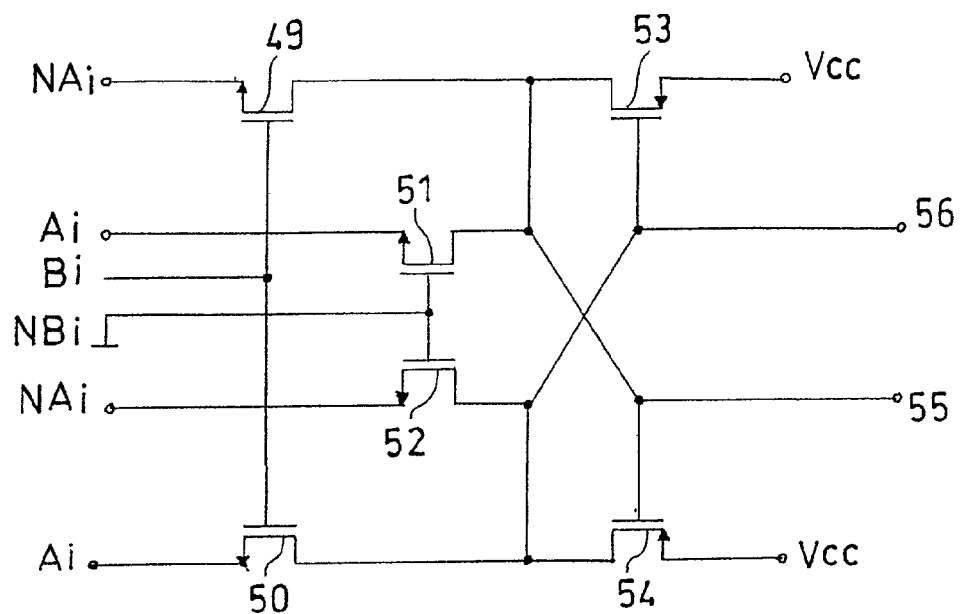
FIG. 11 is the circuit diagram of a two-bit comparator which is formed with DPTL logic (differential pass transistor logic) and is suitable particularly as a component of the binary-number comparator of FIGS. 4 to 9.

This result can be achieved with the use of the logic known as DPTL, shown in FIG. 11.

The bit-to-bit comparator of FIG. 11 is constituted by 4 n-channel transistors 49, 50, 51, 52 and by two p-channel transistors 53, 54 which are comparable, with regard to the supply and regeneration function, to the block 205 of FIG. 4.

The transistors 49, 50 receive the signals NAi and Ai, respectively, at their sources and both are controlled by the signal Bi. The transistors 51, 52 receive the signals Ai and NAi, respectively, at their sources and both are driven by the signal NBi. The drains of the transistors 49, 51, 53 are connected to an output node 55 and the drains of the transistors 50, 52, 54 are connected to a second output node 56.

It can readily be seen that for Ai=1 and Bi=1, the transistor 49 is made conductive and forces the node 55 to 0, which in turn forces the node 56 to 1. Similarly, if Ai=0 and Bi=0, the transistor 51 is made conductive with the same effect as in the previous case.

If there is a difference between Ai and Bi, the transistor 50 is made conductive (if Ai=0 and Bi=1) or the transistor 52 is made conductive (if Ai=1 and Bi=0), so that the node 56 is forced to 0 and the node 55 is forced to 1.

Only two p-channel transistors are required in this circuit, with clear advantages in terms of size and switching speed.

Many further variations may be applied without departing from the spirit of the invention.

Figure 12:
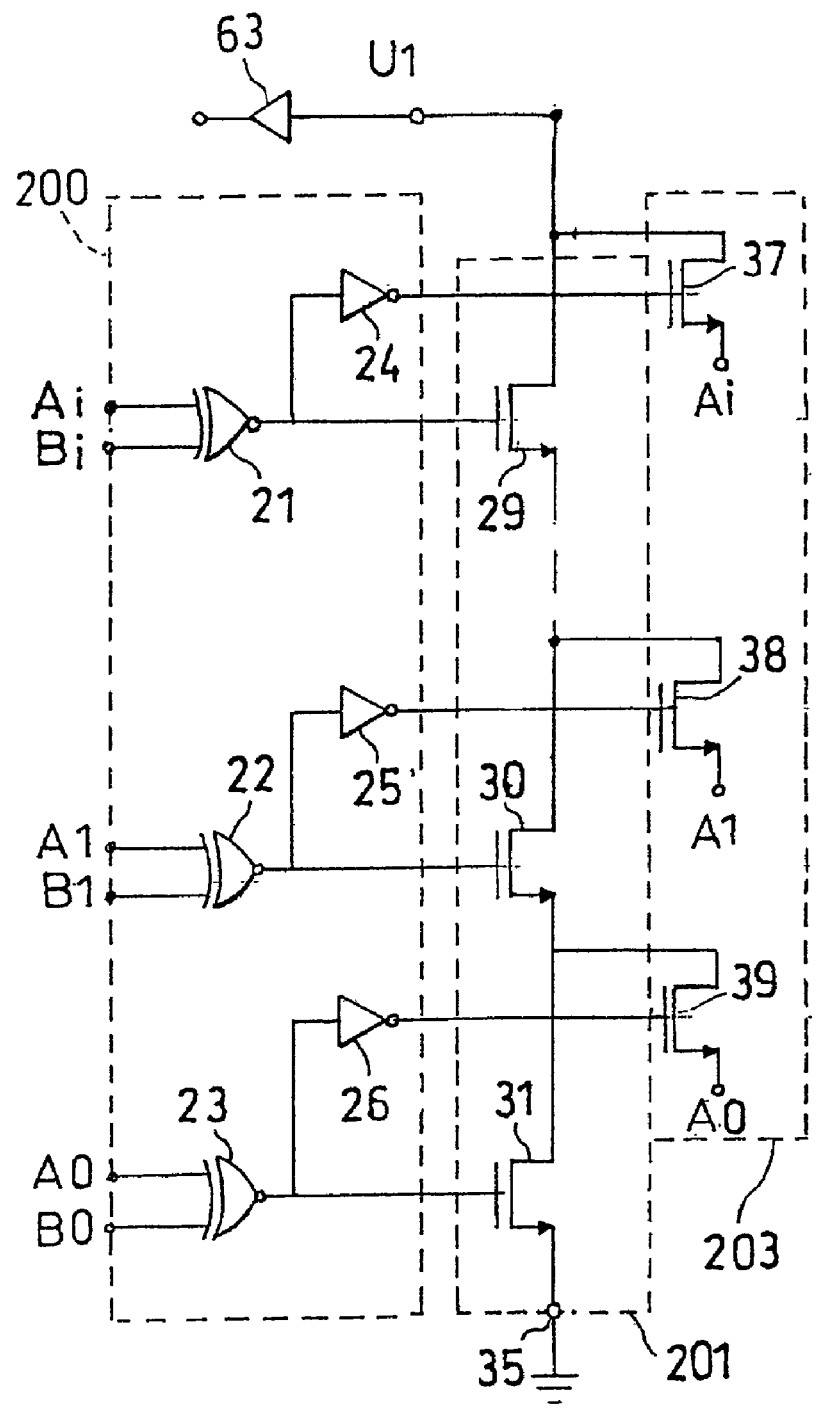
FIG. 12 is the circuit diagram of a simplified version of the comparator according to the present invention.

For example, FIG. 12 shows a simplified embodiment of the comparator of FIG. 4.

In FIG. 12, elements functionally corresponding to those of FIG. 4 are identified by the same reference numerals.

The comparator of FIG. 12 is constituted by a first block 200 of N detector circuits for detecting equality/difference between homologous bits of the two numbers to be compared, each detector circuit outputting a signal relating to the equality/difference between homologous bits, and a second block 201 for detecting equality/difference between the binary numbers compared, and having inputs connected to the outputs of the first block and at least one output U1.

The terminal 35 of the block 201 in this embodiment is connected to earth in a manner consistent with the function considered for the comparator which, in the example given, is that of a greater-than detector.

The comparator also comprises a third decision block 203 which, in the case of inequality, recognizes the greater condition, for example, of the binary number A, the bits A0, A1, . . . Ai of which are applied to the sources of the transistors 39, 38, 37, respectively.

The connections between the blocks 200, 201, 203 are identical to those of FIG. 4 and are not described.

Naturally, if the numbers compared are identical (A=B), the output U1 is connected to earth through the series of transistors 29, 30, 31.

The supply and regeneration block (205 of FIG. 4) in this case is preferably replaced by a buffer 63 which ensures a low output impedance and adequate regeneration of the output-signal levels.

In applications in which a low output impedance and large noise margin are not required, that is, in which some deviation of the electrical level of the signal output by the comparator from the values Vcc and GND is acceptable, the buffer 63 is unnecessary, which is advantageous with regard to the response speed of the comparator.

If the two numbers are different (A≠B), the line formed by the transistors 29, 30, 31 is open at some point and that of the transistors 37, 38, 39 of the third decision block which is driven by the signal relating to difference between the most significant pair of different bits brings the node U1 to positive electrical level, detecting the condition A>B.

Clearly, if the bits Bi, B1, B0 were applied to the sources of the transistors 37, 38, 39, the condition B>A would be detected.

It is also clear that, if the terminal 35 of the block 201 were connected to Vcc, with Ai, A1, A0 applied to the sources of the transistors 37, 38, 39, the condition A≧B would be detected (or B≦A if the bits Bi, B1, B0 were applied to the sources of the transistors 37, 38, 39).

Similar results are obtained with the use of the signals NBi and NAi in place of Ai and Bi.

Naturally, the discriminatory function of the block 203 can be masked by connecting the sources of the transistors 37, 38, 39 to the voltage Vcc or to earth, for example, to earth with the terminal 36 to Vcc to recognize the equality condition, and to Vcc with the terminal 35 connected to earth to recognize the difference condition.

Having thus described at least one illustrative embodiment of the invention, various alterations, modifications, and improvements will readily occur to those skilled in the art. Such alterations, modifications, and improvements are intended to be within the spirit and scope of the invention.

Accordingly, the foregoing description is by way of example only and is not intended as limiting. The invention is limited only as defined in the following claims and the equivalents thereto.

What is claimed is:

1. A comparator for comparing two N-bit binary numbers, comprising:

a block of N circuits for detecting equality/difference between homologous bits of the two numbers, the circuits being arranged in decreasing order of significance, that is of weight, of the bits compared, and each circuit outputting a first, logic-level 1 and electrically-positive signal on a correspondingly arranged continuity/disconnection line, if the bits compared are identical, and a logic-level 1 and electrically-positive signal on a correspondingly arranged decision line if the bits compared are different, a matrix-like structure of n-channel transistors arranged to form 4 columns of N rows of transistors, arranged in an order corresponding to that of the detector circuits and of the corresponding continuity and decision lines, the transistors of a first and of a second of the columns being connected in series with one another in order, the respective first transistors in order, of the of the first and second columns having their respective drains connected to a first node and to a second node, respectively, at least one of the nodes constituting an output node, the respective last transistors in order, of the first and second columns having their respective sources connected to respective input terminals so as to receive a positive or zero voltage signal according to the comparison function to be performed, the transistors arranged in order in the third column having their drains connected, respectively and in order, to the first node and to the intermediate nodes between the transistors of the first column, in sequence, the transistors arranged in order in the fourth column having their drains connected, respectively and in order, to the second node and to the intermediate nodes between the transistors of the second column, in sequence, the gates of the transistors of the first and second columns being connected in the order of the transistors, to a correspondingly arranged continuity line, the gates of the transistors of the third and fourth columns being connected, in the order of the transistors, to a correspondingly arranged decision line, the sources of the transistors arranged in order in the third and fourth columns being biased in order, in dependence on the comparison function to be performed, by one and by the other, respectively, of a pair of signals belonging to a set of pairs of signals selected from at least the following sets:

the set of pairs of signals representative of the bits, in decreasing order of significance, of one of the binary numbers compared, and of their negated forms, the set constituted by a positive voltage signal applied to the sources of the transistors of one of the two columns and by a zero voltage signal applied to the sources of the transistors of the other column, and a signal supply and regeneration block connected to a source of a positive voltage Vcc which, in response to a zero-level voltage signal imparted by the matrix to the first node, imparts the positive voltage Vcc to the second node and, in response to a zero-level voltage signal imparted by the matrix to the second node, imparts the positive voltage Vcc to the first node.

2. A comparator according to claim 1 in which the supply and regeneration block comprises a first transistor and a second transistor which have their gates and sources connected to one another and which are connected to the first node and to the second node respectively.

3. A comparator according to claim 1 in which the supply block comprises a first inverter and a second inverter which have their inputs and outputs connected to one another and which are connected to the first and second nodes, respectively.

4. A comparator according to claim 1 in which the supply and regeneration block comprises a first output buffer and a second output buffer which have their inputs connected to the first and second output nodes, respectively.

5. A comparator according to claim 1 in which the circuits for detecting equality/difference between homologous bits comprise a pair of pass-gates.

6. A comparator according to claim 1 in which the circuits for detecting equality/difference are formed in DPTL logic.

7. A comparator for comparing multi-bit binary numbers, comprising at least a first comparator and a second comparator according to claim 2, for comparing the least significant bits and the most significant bits of the binary numbers, respectively, the first and second output nodes of the first comparator being connected to the input terminals of the third and fourth columns of transistors of the second comparator, respectively.

8. A comparator according to claim 7, comprising more than two comparators according to claim 6, connected in cascade.

* * * * *